(12) United States Patent
Shiue et al.

(10) Patent No.: US 7,174,494 B2
(45) Date of Patent: Feb. 6, 2007

(54) METHOD AND SYSTEM FOR CODED NULL PACKET-AIDED SYNCHRONIZATION

(75) Inventors: Dong-Chang Shiue, Carmel, IN (US); Maxim B. Belotserkovsky, Indianapolis, IN (US)

(73) Assignee: Thomson Licensing, Billancourt (FR)

( * ) Notice: Subject to any disclaimer, the term of this patent is extended or adjusted under 35 U.S.C. 154(b) by 190 days.

(21) Appl. No.: 10/611,074

(22) Filed: Jul. 1, 2003

(65) Prior Publication Data
US 2005/0005205 A1    Jan. 6, 2005

(51) Int. Cl.
*H03M 13/00* (2006.01)

(52) U.S. Cl. .................. 714/752; 714/786; 714/789; 714/798

(58) Field of Classification Search ............... 714/752, 714/775, 789, 798
See application file for complete search history.

(56) References Cited

U.S. PATENT DOCUMENTS

| | | | | |
|---|---|---|---|---|
| 5,408,504 A | * | 4/1995 | Ostman ..................... 375/354 |
| 5,909,462 A | * | 6/1999 | Kamerman et al. ......... 375/147 |
| 6,414,945 B1 | * | 7/2002 | Chennakeshu et al. ..... 370/317 |
| 6,498,822 B1 | * | 12/2002 | Tanaka ....................... 375/354 |
| 6,661,855 B2 | * | 12/2003 | Kim ............................ 375/343 |
| 6,731,947 B2 | * | 5/2004 | Hoagland et al. ........... 455/517 |

* cited by examiner

*Primary Examiner*—Albert Decady
*Assistant Examiner*—Esaw T. Abraham
(74) *Attorney, Agent, or Firm*—Joseph J. Laks; Ronald H. Kurdyla; Vincent E. Duffy

(57) ABSTRACT

A communication system comprising a transmitter that is adapted to transmit a data signal that is broken into a plurality of time slots. The transmitter inserts communication data into a subset of the plurality of time slots and to create null data representative of information about the communication system. The null data is inserted into a subset of the plurality of time slots not occupied by communication data. A communication system comprising a receiver that receives a data signal that is broken into a plurality of time slots. The receiver identifies correlation peaks in the data signal that correspond to a subset of the plurality of time slots, the subset of the plurality of time slots including null data representative of information about the communication system. The receiver may associate logical values with the correlation peaks and decode the logical values to obtain the information about the communication system.

20 Claims, 2 Drawing Sheets

| DATA | AUDIO CHANNEL | | | | | | | |
|---|---|---|---|---|---|---|---|---|
| | TS1 | RS1 | TS2 | RS2 | TS3 | RS3 | TS4 | RS4 |
| TD1 | TS1 EVEN | RS1 EVEN | TS2 EVEN | RS2 EVEN | TS3 EVEN | RS3 EVEN | TS4 EVEN | RS4 EVEN |
| RD1 | TS1 ODD | RS1 ODD | TS2 ODD | RS2 ODD | TS3 ODD | RS3 ODD | TS4 ODD | RS4 ODD |
| ... | ... | ... | ... | ... | ... | ... | ... | ... |
| ... | ... | ... | ... | ... | ... | ... | ... | ... |
| TD$n$ | TS1 EVEN | RS1 EVEN | TS2 EVEN | RS2 EVEN | TS3 EVEN | RS3 EVEN | TS4 EVEN | RS4 EVEN |
| RD$n$ | TS1 ODD | RS1 ODD | TS2 ODD | RS2 ODD | TS3 ODD | RS3 ODD | TS4 ODD | RS4 ODD |

METHOD AND SYSTEM FOR CODED NULL PACKET-AIDED SYNCHRONIZATION

FIELD OF THE INVENTION

The present invention relates to improving time division multiple access (TDMA) synchronization in a direct sequence spread spectrum communication (DSSS) system.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a TDMA communication system, a base unit facilitates communication between other base units and multiple local mobile terminals (MTs), which may also be referred to as handsets. The base unit and the mobile terminals are typically capable of transmitting and receiving a data signal at a particular frequency or group of frequencies. The data signal is broken into a number of smaller increments known as time slots, which may recur during each cycle of the data signal. Using TDMA, multiple data transmission sessions can take place simultaneously. During a given communication session, a mobile terminal may be assigned a particular time slot. The data from that mobile terminal may be transmitted in the assigned time slot for the duration of a communication session. For a given base station environment, it is typical for at least some TDMA timeslots to be unused at a given time.

TDMA may be used in spread spectrum communication systems, such as DSSS systems. In a DSSS system, the original data signal is spread by multiplying it with a wideband spreading code. Spreading converts a narrowband signal with a relatively high power spectral density into a wideband signal that has a low power spectral density. That is, the energy of the signal is spread out over a wide frequency range. A DSSS signal is often below the noise floor.

A DSSS receiver is able to process the signal because of the correlation gain from correlating against the spreading code at the receiver. Because of their low power spectral density, DSSS signals are often hard to detect and cause very little interference with other signals in that frequency band.

A typical method of synchronizing a TDMA structure that is being received is to decode the payload data contained in data packets associated with the various time slots to determine the reference point in the TDMA structure of the decoded packet. This scheme generally requires a receiving system to, first, reliably detect the packet boundaries and then to be able to demodulate, decode and otherwise process the packet to extract the relevant TDMA information. Such initial packet boundary detection may be difficult to perform, especially in conditions where signal-to-noise ration (SNR) SNR is low.

An example of the typical method is to correlate the received data signals with an appropriate pseudo-noise (PN) sequence to determine the correlation peak locations. When the correlation peak locations are known, packet boundaries may be locked onto and payload data decoded based on the location of the data relative to the identified packet boundary. In such a scheme, the detection of the correlation peaks does not provide any information about the TDMA structure until the payload data is decoded using forward error correction (FEC) technology. An apparatus and method that allows a reliable determination of the TDMA structure of a data signal in the correlation domain without decoding the FEC-encoded payload data, thus speeding up the TDMA acquisition and improving its accuracy, is desirable.

SUMMARY OF THE INVENTION

The disclosed embodiments relate to a communication system comprising a transmitter that is adapted to transmit a data signal that is broken into a plurality of time slots. The transmitter is adapted to insert communication data into a subset of the plurality of time slots and to create null data representative of information about the communication system. The null data is inserted into a subset of the plurality of time slots not occupied by communication data.

Other disclosed embodiments relate to a communication system comprising a receiver that is adapted to receive a data signal that is broken into a plurality of time slots. The receiver is adapted to identify correlation peaks in the data signal that correspond to a subset of the plurality of time slots, the subset of the plurality of time slots including null data representative of information about the communication system. The receiver may associate logical values with the correlation peaks and decode the logical values to obtain the information about the TDMA structure of the communication system.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development is effort might be complex and time consuming, but would nevertheless be a routine undertaking of design, fabrication, and manufacture for those of ordinary skill having the benefit of this disclosure.

Figures 1, 2:
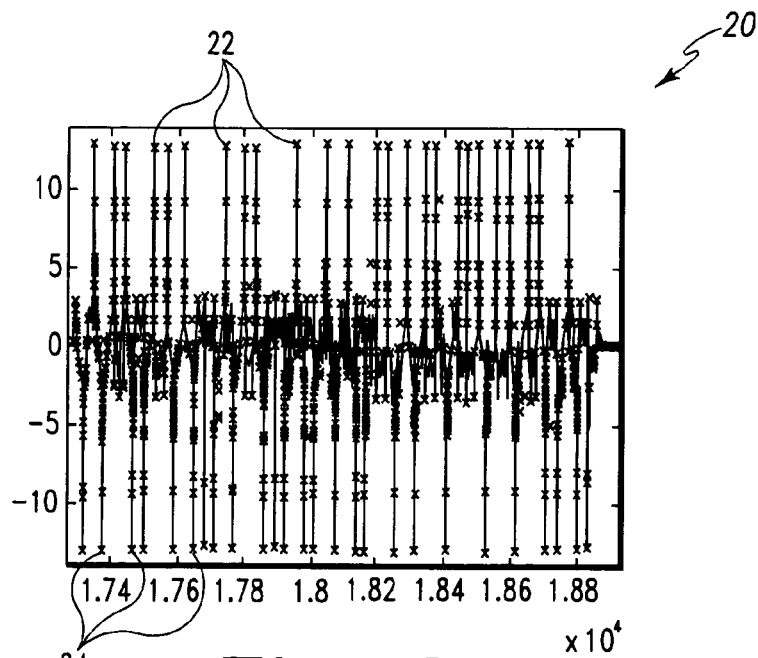
FIG. 1 is a diagram showing an exemplary TDMA structure in accordance with embodiments of the present invention.
FIG. 2 is a graph showing correlation domain data corresponding to the TDMA structure shown in FIG. 1.

FIG. 1 is a diagram showing an exemplary TDMA structure in accordance with embodiments of the present invention. The TDMA structure, which illustrates the view of a TDMA base station, is generally referred to by the reference numeral 10. TD1 represents a command data transmission slot. RD1 represents a command data receive slot. The rows that begin with TD1 and RD1 together comprise a first horizontal slot. TS1, TS2, TS3 and TS4 each correspond to various odd and even transmission time slots. RS1, RS2, RS3 and RS 4 each correspond to various odd and even receive time slots. An nth horizontal slot is represented by the two rows that begin, respectively, with a command data transmission slot TDn and a command data receive slot RDn.

At any given time, one or more of the transmission slots TSn may be unused for purposes of transmitting communication data. The transmission slots may be unused because no mobile terminal is engaged in a communication session that requires the use of the time slot for communication data. The base station may insert fixed signature data in the form of null data packets into all unused time slots. The term "null data," as used herein, means a pre-defined signature packet that is different from an information-bearing payload packet containing data transmitted on the TDMA slots already occupied. The expression "null" is not intended to imply an all-zero packet.

Each time slot may be given its own predetermined identity pattern that is embedded in an otherwise unused time slot. The data may be determined by examining the correlation peaks before the data packet itself is decoded by a receiver. A mobile terminal desiring to establish the initial synchronization with the base station may correlate the received signals and determine immediately what kind of packet is being received is and/or determine which time slot is available for transmission.

The null packets sent by the base station may carry information indicating the identity of the associated time slots in the correlation domain. This means that the correlation bin patterns themselves embody the information sent by the base station. Thus, a mobile unit or handset desiring to establish a communication link can immediately find an available time slot without going through layers of protocol and decoding the payload data. Any handset that 'wakes up' from the sleep mode can quickly re-synchronize by matching the received correlation patterns and adjusting the timing and carrier offsets accordingly.

FIG. 2 is a graph showing correlation domain data corresponding to the TDMA structure shown in FIG. 1. The graph shown in FIG. 2 is generally referred to by the reference numeral 20. The x-axis of the graph 10 shows a range of correlation bin index values and the y-axis shows the amplitude of a received TDMA signal.

A plurality of positive correlation peaks 22 correspond to various symbols transmitted in the transmission slots (TS) shown in FIG. 1. Similarly, a plurality of negative correlation peaks 24 also correspond to various symbols transmitted in the transmission slots (TS) shown in FIG. 1. Three positive correlation peaks have been specifically identified with the reference numeral 22 and three negative correlation peaks have been identified with the reference numeral 24 in FIG. 2 for purposes of illustration. Those of ordinary skill in the art will appreciate that other correlation peaks having approximately the same positive amplitude as the correlation peaks 22 and the same negative amplitude as the correlation peaks 24 are illustrated in FIG. 2.

The pattern of the correlation peaks shown in FIG. 2 may embody useful information sufficient to allow any mobile unit or handset receiver to determine TDMA system parameters. Examples of data that may be coded into null packets to convey this information include whether the packet was sent by a base station or a mobile unit, the identity of a time slot in which a packet is received (including the vertical slot number, horizontal slot number and whether the slot is odd or even), transmission power level, strong or weak forward error correction (FEC) or the like. In the TDMA structure shown in FIG. 1 and corresponding correlation peak data shown in FIG. 2, eight (8) audio and one (1) command data slots require at least nine (9) patterns of correlation peaks.

The correlation peaks shown in FIG. 2 may be assigned a logical value, such as a logical value of "0" or "1." A negative peak bin can be mapped to logic 1 and positive peak bin can be mapped to logic 0, or vice versa. The correlation peak patterns may be designed in such a way that each pattern has a maximum distance from others in the correlation domain. For instance, the distance between a group of correlation peak data A=(1 0 1 0) and a group of correlation peak data B=(0 1 0 0) is three (3) if distance is defined as the number of places where the data elements differ. The maximum distance among the null packets will give rise to better pattern matching performance.

If 51 symbols are contained in each data packet, the correlation bins generated from payload data may be identical to the signature correlation bins. However, a possible solution may be to use redundancy in the signature patterns. The payload data is typically randomized and the repetition of strings of 0s or 1s for a long duration is rare. In the signature patterns, the repetition of 0s or 1s can be created on purpose to eliminate the possibility of having identical payload data generated pattern and signature pattern. An alternative way to achieve unambiguous detection may be to look for the correlation pattern to occur multiple (2 or more) times separated by a pre-defined number of packets. The probability of a payload pattern to repeatedly match one of the designated signature patterns should be insignificantly low.

Figure 3:
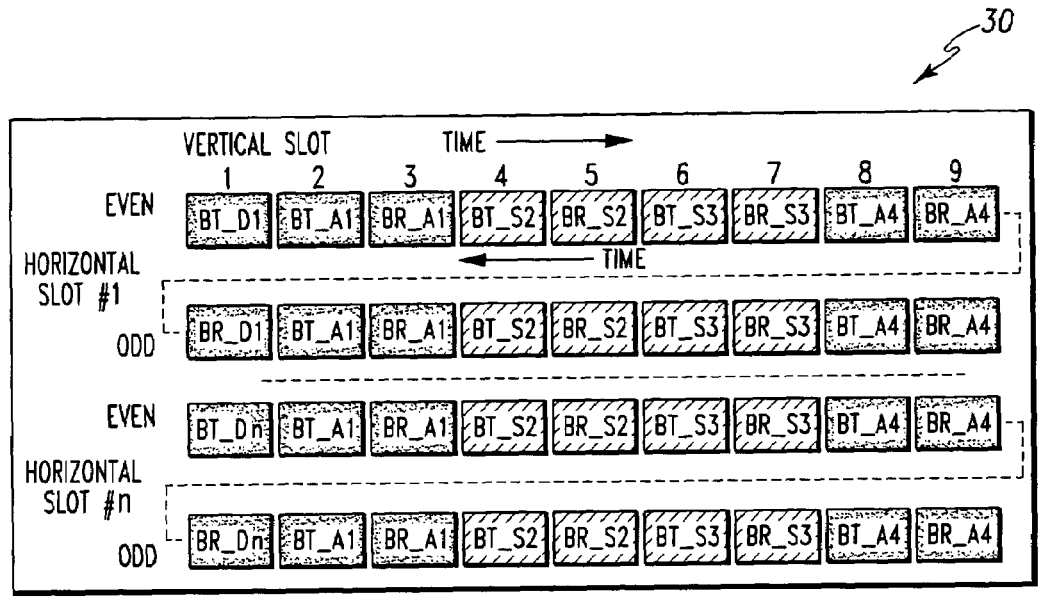
FIG. 3 is a diagram showing an alternative exemplary TDMA data structure in accordance with embodiments of the present invention.

FIG. 3 is a diagram showing an alternative exemplary TDMA data structure in accordance with embodiments of the present invention. The TDMA structure, which illustrates the view of a TDMA base station, is generally referred to by the reference numeral 30. A first horizontal slot comprises odd and even rows. The even row includes a command data transmission slot BT_D1 and occupied data transmission slots BT_A1 and BT_A4. Also included in the even row are occupied data receive slots BR_A1 and BR_A4. Empty even data receive slots (shown in hatched lines) are identified as BR_S2 and BR_S3. Finally, empty even data transmission slots (shown in hatched lines) are identified as BT_S2 and BT_S3. The empty even data transmission slots BT_S2 and BT_S3 may be filled with TDMA signature data, as set forth above with reference to FIG. 1 and FIG. 2.

The odd row of the first horizontal slot includes a command data receive slot BR_D1 and occupied data transmission slots BT_A1 and BT_A4. Also included in the odd row are occupied data receive slots BR_Al and BR_A4. Empty even data receive slots (shown in hatched lines) are identified as BR_S2 and BR_S3. Finally, empty odd data transmission slots (shown in hatched lines) are identified as BT_S2 and BT_S3. The empty odd data transmission slots BT_S2 and BT_S3 may be filled with TDMA signature data, as set forth above with reference to FIG. 1 and FIG. 2.

An nth horizontal slot is also shown in FIG. 3. The time slots of the nth horizontal slot correspond to the like-named time slots in the first horizontal slot.

Figure 4:
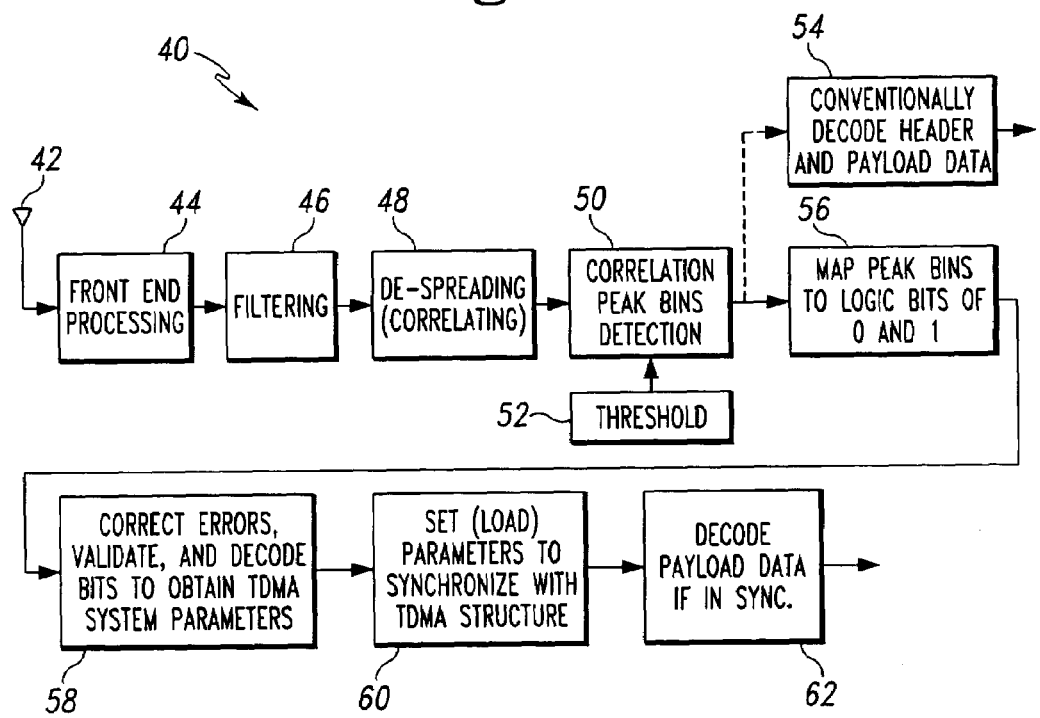
FIG. 4 is a block diagram illustrating a device for receiving and interpreting null packets in accordance with an embodiment of the present invention.

FIG. 4 is a block diagram illustrating a device for receiving and interpreting null packets in accordance with an embodiment of the present invention. The block diagram is generally referred to by the reference numeral 40.

An antenna 42 is adapted to receive a data transmission from a receiver such as a TDMA base station in a DSSS communication system. The received data signal may be subjected to front end processing by a front end processing block 44 and filtering by a filter block 46. The filtered data signal may be subjected to de-spreading (correlation) by a de-spreader 48. The output of the de-spreader 48 is delivered to a correlation peak bin detector 50, which may receive a threshold input 52 to help determine the threshold level of data comprising the null packets described above with reference to FIG. 1 and FIG. 2.

The output of the correlation peak bin detector is delivered to a peak bit mapper 56, which translates the correlated peak bins to logical 0s and 1s. The logical translation of the correlated peak bits results in data corresponding to the signature data that was embedded in an otherwise empty time slot by the transmitter that generated the data signal. The output of the correlation peak bin detector 50 may optionally be delivered to a conventional decoder 54 for FEC decoding or the like.

The signature data from the mapper 56 is delivered to a validater and decoder 58, which interprets the signature data that was embedded into the null packets. The validater and decoder 58 may also include error correction capability. For example, the information contained in the null packets may be encoded with an FEC block code. An FEC block code may be applied to the correlation-peak-mapped 0s and 1s to correct mapping errors because of the very low SNR environment. Also, parity bits or other forms of error checking and correcting may be employed to check the integrity of the mapped bits.

A control block 60 may receive signature data from the validater and decoder 58 and use that data to set or load synchronization parameters to apply to data packets that contain communication data instead of signature data. If the signature data decoded from the otherwise empty timeslots is correctly interpreted, the payload data from slots containing actual data may be decoded by a decoder 62.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A communication system comprising a transmitter for transmitting a data signal comprising a plurality of time slots, the transmitter:
    inserting communication data into a subset of the plurality of time slots;
    creating fixed signature data representative of information about the communication system; and
    inserting the fixed signature data into a subset of the plurality of time slots not occupied by communication data.

2. The communication system set forth in claim 1, wherein the communication system is a time division multiple access (TDMA) communication system.

3. The communication system set forth in claim 1, wherein the communication system is a direct sequence spread spectrum (DSSS) communication system.

4. The communication system set forth in claim 1, wherein the communication data is encoded using a forward error correction (FEC) code and the fixed signature data is not encoded using an FEC code.

5. The communication system set forth in claim 1, wherein the fixed signature data is encoded using a forward error correction (FEC) code.

6. The communication system set forth in claim 1, wherein the subset of the plurality of time slots not occupied by communication data comprises all of the time slots not occupied by communication data.

7. The communication system set forth in claim 1, wherein the information about the communication system comprises an identifier associated with the time slot into which the fixed signature data is inserted.

8. The communication system set forth in claim 1, wherein the information about the communication system comprises a power level at which the transmitter is transmitting the data signal.

9. A communication system comprising a receiver for receiving a data signal comprising a plurality of time slots, the receiver:
    identifying correlation peaks in the data signal that correspond to a subset of the plurality of time slots, the subset of the plurality of time slots including fixed signature data representative of information about the communication system;
    associating logical values with the correlation peaks; and
    decoding the logical values to obtain the information about the communication system.

10. The communication system set forth in claim 9, wherein the subset of the plurality of time slots does not contain communication data.

11. The communication system set forth in claim 9, wherein the receiver employs the information about the communication system to set synchronization parameters for use in decoding packets that contain communication data.

12. The communication system set forth in claim 9, wherein the receiver decodes packets that contain communication data using the information about the communication system.

13. The communication system set forth in claim 9, wherein the communication system is a time division multiple access (TDMA) communication system.

14. The communication system set forth in claim 9, wherein the communication system is a direct sequence spread spectrum (DSSS) communication system.

15. The communication system set forth in claim 9, wherein the logical values are decoded without using a forward error correction (FEC) code.

16. The communication system set forth in claim 9, wherein the logical values are decoded using a forward error correction (FEC) code.

17. The communication system set forth in claim 9, wherein the information about the communication system comprises an identifier associated with the time slot into which the fixed signature data is inserted.

18. The communication system set forth in claim 9, wherein the information about the communication system comprises a power level at which the transmitter is transmitting the data signal.

19. A method of interpreting a data signal, the data signal being broken into a plurality of time slots, the method comprising:
    identifying correlation peaks in the data signal, the correlation peaks corresponding to a subset of the plurality of time slots, the subset of the plurality of time slots including fixed signature data representative of information about the communication system;
associating logical values with the correlation peaks; and
decoding the logical values to obtain the information about the communication system.

20. The method set forth in claim 19, comprising decoding data packets that contain communication data using the information about the communication system.

* * * * *